3,097,221
POLYCYANOPOLYENES AND PROCESSES FOR PREPARING THEM

Douglas W. Wiley, Wilmington, Del., assignor to E. I. du Pont de Nemours and Company, Wilmington, Del., a corporation of Delaware
No Drawing. Filed Apr. 28, 1960, Ser. No. 25,197
11 Claims. (Cl. 260—430)

This invention is concerned with a new class of acidic organic compounds and their salts which are useful as dyes.

In the field of dyes the covering power or tinctorial power of any specific dye is one of the primary factors controlling its practical utility.

It is an object of the present invention to provide compounds which have tinctorial powers far in excess of what would be expected on the basis of related chemical structures. A further object is to provide processes for the preparation of such compounds.

These and other objects are accomplished by providing a new class of polycyanopolyenes, viz., 1,1,2,4,5,5-hexacyano-2,4-pentadiene and 1,1,2,6,7,7-hexacyano-2,4,6-heptatriene, and their salts.

Processes for the preparation of the polycyanopolyenes of this invention are based on reactions of 4-hydrocarbyloxy-1,1,2-tricyano-1,3-butadienes in the presence of an alcohol under neutral or alkaline conditions. When a 4-hydrocarbyloxy-1,1,2-tricyano-1,3-butadiene reacts with itself in the presence of water, an alcohol, or an N,N-dialkylamide, 1,1,2,6,7,7-hexacyano-2,4,6-heptatriene is formed. When a 4-hydrocarbyloxy-1,1,2-tricyano-1,3-butadiene reacts in the presence of water, an alcohol, or an N,N-dialkylamide with another tricyanovinyl compound, such as tricyanovinyl chloride, tricyanovinyl ethyl ether, tetracyanoethylene, and the like, 1,1,2,4,5,5-hexacyano-2,4-pentadiene is obtained.

When the reactions described above are carried out in alkaline media, the products are obtained in the form of the corresponding alkali salts. For example, if sodium hydroxide is present, the corresponding sodium salt is obtained.

The products of this invention can be represented by the following formula:

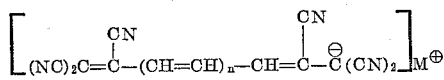

in which $n$ is 0 or 1 and M is any cation. For example, the cation can be hydrogen, as in the parent acidic compounds, or one equivalent of any ammonium, sulfonium, or metallic cation. The salts may be readily prepared from the free acids by metathesis with a base.

In naming the compounds of this invention, the anions obtained by removing a proton from each of the respective acidic products are referred to as the 1,1,2,4,5,5-hexacyano-2,4-pentadienide and 1,1,2,6,7,7-hexacyano-2,4,6-heptatrienide ions. One skilled in the art will recognize that the above formula presents only one of several resonance forms contributing to the structure of the anion. In the several resonance forms, the charge of the anion may be visualized as associated with various atoms in the ion. The names indicated above are considered to cover these ions regardless of which resonance form may contribute the most to the structure of the anion.

The processes of this invention are carried out in the presence of water, an alcohol, or an N,N-dialkylamide. Preferably, the alcohol is a low molecular weight aliphatic monohydric alcohol. Thus, there can be employed methanol, ethanol, propanol, butanol, cyclohexanol and the like, as well as dimethylformamide, diethylformamide, and other lower N,N-dialkylamides.

The reaction of a 4-hydrocarbyloxy-1,1,2-tricyano-1,3-butadiene with a tricyanovinyl compound such as tricyanovinyl chloride, tricyanovinyl ethyl ether, or tetracyanoethylene to yield a 1,1,2,4,5,5-hexacyano-2,4-pentadiene takes precedence over the reaction of a 4-hydrocarbyloxy-1,1,2-tricyano-1,3-butadiene with itself under the same conditions to yield a 1,1,2,6,7,7-hexacyano-2,4,6-heptatriene. Thus, the presence or the absence of the tricyanovinyl compound determines which product will be obtained. By the use of partial molar quantities of the tricyanovinyl compound, mixtures of the two products can be prepared as desired.

The 4 - hydrocarbyloxy - 1,1,2 - tricyano - 1,3 - butadienes used in preparing the products of this invention can be prepared by the reaction of tricyanovinyl chloride with a 1-hydrocarbyloxy-2-hydrogenethylene. For example, equimolar quantities of tricyanovinyl chloride and methyl vinyl ether react in tetrahydrofuran solution at 20–50° C. to yield 4-methoxy-1,1,2-tricyano-1,3-butadiene. This product is purified by chromatography in benzene over acidic activated alumina to yield yellow needles melting at 101–103° C. When benzyl vinyl ether is used in place of methyl vinyl ether, 4-benzyloxy-1,1,2-tricyano-1,3-butadiene is obtained. It is a bright yellow solid melting at 106.5–107.5° C.

The hydrocarbyl moiety in the 4-hydrocarbyloxy-1,1,2-tricyano-1,3-butadienes used in this invention can be any radical composed of carbon and hydrogen which is free of aliphatic carbon-to-carbon unsaturation. Otherwise it may be large or small and may contain any of the hydrocarbon structures, such as alkyl, aryl, cycloalkyl, aralkyl, alkaryl, and the like. In the process of this invention the hydrocarbyloxy groups are lost as by-products. Hydrocarbyl groups of 20 carbon atoms or less are therefore preferred for reasons of economy. The term "hydrocarbyl" is synonymous with "hydrocarbon radical."

In the following illustrative examples parts are by weight unless otherwise specified.

EXAMPLE I

*Part A.*—To a solution of 274 parts of freshly sublimed tricyanovinyl chloride in 444 parts of tetrahydrofuran is added 268 parts of benzyl vinyl ether dissolved in 444 parts of tetrahydrofuran. The yellow solution warms spontaneously to 44° C. within 5 minutes. It is heated to reflux for 10 minutes and then allowed to cool to room temperature. The vapors above the deep red solution are acidic. Petroleum ether, B.P. 30–60° C., is added until the solution is just cloudy. Chilling to 0° C. gives 100 parts of crude 4-benzyloxy-1,1,2-tricyano-1,3-butadiene as dark crystals. Extraction of the crude material with 100 volumes of refluxing cyclohexane followed by cooling gives the product in the form of fluffy orange-yellow platelets.

*Part B.*—4 - benzyloxy - 1,1,2 - tricyano - 1,3 - butadiene is boiled in an excess of methanol to obtain 1,1,2,6,7,7-hexacyano-2,4,6-heptatriene in the form of a deep blue solution in methanol.

EXAMPLE II

A solution of 67 parts of 4-benzyloxy-1,1,2-tricyano-1,3-butadiene in 7,930 parts of methanol is heated at reflux for 50 minutes. Tests on small portions of the mixture show that an absorption at 635 millimicrons reaches maximum intensity after 30 minutes. The methanol solution is then poured into about 50,000 parts of dilute aqueous sodium chloride solution and extracted continuously with ether. The resulting blue ether solution is concentrated by evaporation. The residue is chromatographed on activated acidic alumina containing traces of sodium salts. A mixture of ethyl acetate and acetone is used to develop the column. The column is extruded and the deep blue band extracted with methanol/acetone. The product thus obtained is recrystallized two times from methanol to give 47 parts of the sodium salt of 1,1,2,6,7,7-hexacyano-2,4,6-heptatriene solvated with 1½ moles of methanol in the form of green needles melting with decomposition above 300° C.

*Analysis.*—Calcd. for $C_{13}H_3N_6Na \cdot 1½CH_3OH$: C, 55.4; H, 2.8; N, 26.8. Found: C, 56.1, 56.0; H, 2.9, 2.8; N, 26.5, 26.1.

EXAMPLE III 4-benzyloxy-1,1,2-tricyano-1,3-butadiene, prepared as in part A of Example I, is boiled in an excess of ethanol to obtain 1,1,2,6,7,7-hexacyano-2,4,6-heptatriene in the form of a deep blue solution in ethanol.

EXAMPLE IV

A solution of 500 parts of 4-benzyloxy-1,1,2-tricyano-1,3-butadiene in 15,780 parts of ethanol is refluxed for 1½ hours. The resulting deep blue solution is concentrated by evaporation and the residue mixed intimately with 5,000 parts of alumina. The supported dye is then placed on top of a 150,000-part activated acidic alumina column constructed in benzene. The column is developed and eluted progressively with benzene, methylene chloride ethyl acetate, acetone, and methyl alcohol. The acetone-soluble blue is rechromatographed to give 60 parts of the sodium salt of 1,1,2,6,7,7-hexacyano-2,4,6-heptatriene. This is converted to the silver salt by dissolving in water and adding silver nitrate. The resulting silver salt of 1,1,2,6,7,7-hexacyanoheptatriene forms as a dark brown precipitate which is washed and dried. It is only sparingly soluble in alcohol and water, but dissolves in acetonitrile, dimethylformamide, dimethyl sulfoxide, and acetone.

EXAMPLE V

The process of Example IV is repeated using isopropyl alcohol in place of ethanol. The sodium salt of 1,1,2,6,7,7-hexacyano-2,4,6-heptatriene is obtained which is indistinguishable from the product of Example IV.

EXAMPLE VI

*Part A.*—To a stirred solution of 320 parts of tetracyanoethylene in 888 parts of tetrahydrofuran at 0° C. is added a solution of 230 parts of methyl vinyl ether in 444 parts of tetrahydrofuran. The orange reaction mixture is stirred and kept cool for five minutes, at which time a solid begins to precipitate. Cooling is discontinued, and the mixture is allowed to stand at 25° C. for one-half hour. The resulting light green solution containing suspended crystalline material is diluted with about 1650 parts of petroleum ether. The white solid which precipitates is collected by filtration, washed with ether, and dried to yield 430 parts (90% yield) of 3-methoxy-1,1,2,2-tetracyanocyclobutane. After two recrystallizations from 1,2-dichloroethane, this produce melts at 158–159.5° C.

*Part B.*—A mixture of 150 parts of 3-methoxy-1,1,2,2-tetracyanocyclobutane and 793 parts of methanol is refluxed for 23 hours and then filtered. Solvent is removed from the filtrate by evaporation at about 80° C. The grease-like residue is slurried with 2700 parts of ethyl acetate and filtered to yield 19 parts of crude ammonium 1,1,2,6,7,7-hexacyano-2,4,6-heptatrienide in the form of a green crystalline solid. (In this process the 4-methoxy-1,1,2-tricyano-1,3-butadiene which first forms is substantially all converted to the 1,1,2,6,7,7-hexacyano-2,4,6-heptatrienide product.)

*Part C.*—One hundred parts of crude ammonium 1,1,2,6,7,7-hexacyano-2,4,6-heptatrienide, prepared as in part B of this example, is chromatographed on 30,000 parts of acidic activated alumina using ethyl acetate, acetone, and acetonitrile in combination. The deep blue eluates are concentrated by evaporation. The combined residue is rechromatographed on a column of 50,000 parts of acidic activated alumina, segmented into ten sections, and constructed in ethyl acetate. A total of 53,000 parts of 15% acetonitrile/ethyl acetate solution is used to develop the column. The following fractions are then collected:

| Fraction | Solvent | Residue on evaporation of solvent, parts |
|---|---|---|
| 1 | 90,000 parts of ethyl acetate | 5 |
| 2 | 108,000 parts of ethyl acetate | 15 |
| 3 | 26,300 parts of 20+ acetonitrile/ethyl acetate | 9 |
| 4 | 70,200 parts of 20+ acetonitrile/ethyl acetate | 31 |
| 5 | do | 9 |
| 6 | do | 7 |

Fractions 3, 4, 5, and 6 are combined and rechromatographed on acidic activated alumina using ethyl acetate. The residue from evaporation of the eluates is recrystallized three times from methanol to yield the sodium salt of 1,1,2,6,7,7-hexacyano-2,4,6-heptatriene, solvated with one mole of methanol, in the form of glistening green needles melting with decomposition above 300° C. The sodium in this salt arises from traces of sodium salts in the alumina. The absorption spectrum of an ethanol solution of this salt shows the following maxima:

| Absorption peak (millimicrons): | Molecular extinction coefficient |
|---|---|
| 635 | 165,000 |
| 590 (shoulder) | 53,500 |
| 430 | 1,700 |
| 398 | 3,100 |
| 332 | 5,400 |
| 320 (shoulder) | 3,700 |
| 270 (shoulder) | 3,100 |
| 245 | 4,700 |

*Analysis.*—Calcd. for $C_{13}H_3N_6Na \cdot CH_3OH$: C, 56.4; H, 2.4; N, 28.2; O, 5.4. Found: C, 56,2, 56.4; H, 2.0, 2.0; N, 29.5, 29.5; O (direct), 4.1, 4.4.

The original segmented column still containing some less soluble material in extruded. Segments 2, 3, and 4 are extracted with methanol/acetone. The extract is evaporated to dryness and the residue is recrystallized two times from water to yield 6.5 parts of ammonium 1,1,2,6,7,7-hexacyano-2,4,6-heptatrienide in the form of dark green needles melting with decomposition above 300° C. The absorption spectrum of an ethanol solution of this salt shows the following maxima:

| Absorption peak (millimicrons): | Molecular extinction coefficient |
|---|---|
| 635 | 148,000 |
| 590 (shoulder) | 46,000 |
| 430 | 1,600 |
| 398 | 2,900 |
| 332 | 5,000 |
| 320 (shoulder) | 3,500 |
| 270 (shoulder) | 3,200 |
| 245 | 4,600 |

*Anal.*—Calcd. for $C_{13}H_3N_6{}^{\ominus}NH_4{}^{\oplus}$: C, 59.8; H, 2.7; N, 37.6. Found: C, 59.5, 59.8, 58.9; H, 2.9, 2.7, 3.0; N, 36.2, 36.8, 36.3.

EXAMPLE VII

A solution of 163 parts of 3-methoxy-1,1,2,2-tetracyanocyclobutane in 1586 parts of methanol is heated at reflux for 15 hours. There is a slow evolution of hydrogen cyanide. The resulting deep blue solution is concentrated by evaporation at 60–80° C. The dark, gummy residue is washed with benzene until the filtrate is colorless and then washed with two 2670-part portions of methylene chloride. The fine black precipitate which remains is dissolved in a mixture of acetone and ethyl acetate, and passed over a chromatographic column of alumina. Evaporation of the intense blue eluate gives 37 parts of crude 1,1,2,6,7,7-hexacyano-2,4,6-heptatriene in the form of a black solid.

EXAMPLE VIII

A solution of 37 parts of crude 1,1,2,6,7,7-hexacyano-2,4,6-heptatriene in 3000 parts of hot water is treated with an excess of aqueous ammonium chloride. A green precipitate forms immediately. This is recrystallized from hot water to yield 18 parts of ammonium 1,1,2,6,7,7-hexacyano-2,4,6-heptatrienide in the form of fine, bright green needles melting above 300° C., with slow decomposition occurring at 226° C.

Aqueous solutions of 1,1,2,6,7,7-hexacyano-2,4,6 heptatriene are treated with aqueous solutions of inorganic compounds to obtain by metathesis the corresponding 1,1,2,6,7,7-hexacyano-2,4,6-heptatrienide salts as follows:

| Example | Inorganic salt (aqueous solution) | Resulting 1,1,2,6,7,7-hexacyano-2,4,6-heptatrienide | | |
|---|---|---|---|---|
| | | Salt obtained | Solubility in water | Solubility in acetonitrile |
| IX | Barium chloride | Ba++ | Insol | Sol. |
| X | Ferric chloride | Fe+++ | Insol | Sol. |
| XI | Cupric chloride | Cu++ | Insol | Sol. |
| XII | Nickelous chloride | Ni++ | Insol | Sol. |
| XIII | Silver nitrate | Ag+ | Insol | Sol. |
| XIV | Zinc chloride | Zn++ | Insol | Sol |
| XV | Calcium chloride | Ca++ | Partly sol | Sol. |
| XVI | Cadmium chloride | Cd++ | ...do | Sol. |
| XVII | Cobaltous chloride | Co++ | ...do | Sol. |
| XVIII | Ferrous ammonium sulfate. | Fe++ | ...do | Sol. |
| XIX | Lithium nitrate | Li+ | ...do | Sol. |
| XX | Sodium chloride | Na+ | ...do | Sol. |
| XXI | Potassium chloride | K+ | ...do | Sol. |
| XXII | Lead acetate | Pb++ | Sol | Sol. |
| XXIII | Magnesium chloride | Mg++ | Sol | Sol. |
| XXIV | Cuprous chloride | Cu+ | Sol | Sol. |

When the processes of Examples IX–XXIV are repeated, using aqueous solutions of 1,1,2,4,5,5-hexacyano-2,4-pentadiene in place of 1,1,2,6,7,7-hexacyano-2,4,6-heptatriene there are obtained the corresponding barium, ferric, cupric, nickelous, silver, zinc, calcium, cadmium, cobaltous, ferrous, lithium, sodium, potassium, lead, magnesium, and cuprous 1,1,2,4,5,5-hexacyano-2,4-pentadienide salts. In a similar manner other salts such as aluminum, tin, manganese, phenylammonium, diethylammonium, and trimethylsulfonium 1,1,2,4,5,5-hexacyano-2,4-pentadienides and 1,1,2,6,7,7-hexacyano-2,4,6-heptatrienides are formed by metathesis with the corresponding halides.

EXAMPLE XXV

*Part A.*—A solution of 137 parts of tricyanovinyl chloride in 444 parts of tetrahydrofuran is stirred under an atmosphere supplying an excess of methyl vinyl ether. The temperature rises to 51° C. during the first 20 minutes. After 40 minutes, the solution has cooled again and is concentrated, by evaporation, the solution fuming with hydrogen chloride vapors. The product is a dark crystalline mass which is taken up in benzene and passed over a short column of acidic activated aluminum oxide. The first 22,000 parts of benzene is collected and concentrated by evaporation to yield 84 parts of a yellow solid, melting at 98–101° C. This product is recrystallized from carbon tetrachloride to yield brown needles, melting at 100.5–102° C. The product is rechromatographed in benzene over acidic activated alumina oxide as above to yield 30 parts of 4-methoxy-1,1,2-tricyano-1,3-butadiene in the form of bright yellow needles, melting at 101–103° C.

*Part B.*—To 120 parts of 4-methoxy-1,1,2-tricyano-1,3-butadiene dissolved in 793 parts of cold methanol, 104 parts of tricyanovinyl chloride is added in small portions while stirring at 0° C. The resulting intense red solution of 1,1,2,4,5,5-hexacyano-2,4-pentadiene is allowed to warm slowly to room temperature over a one-hour period. A solution of 100 parts of tetramethylammonium chloride in 238 parts of methanol is added in one portion while stirring. The olive grey-green precipitate is filtered and washed with cold methanol and water. Additional material is obtained by diluting the wash liquors with water. A total of 14 parts of crude tetramethylammonium 1,1,2,4,5,5-hexacyano-2,4-pentadienide is obtained. After three recrystallizations from methanol followed by drying at 80° C. under vacuum for three hours, the product melts at 297–299° C. with decomposition, after first changing appearance around 265° C. The light absorption spectrum of an ethanol solution shows the following maxima:

| Absorption peak (millimicrons): | Molecular extinction coefficient |
|---|---|
| 538 | 82,000 |
| 504 | 37,100 |
| 368 | 2,100 |
| 350 | 2,300 |
| 308 | 7,200 |
| 296 | 6,200 |

The infrared absorption spectrum shows peaks at 2195 ($C\equiv N$), 1500, 1480, 1390, 1275–1290, 1225, 1180, 950, and 835 cm.$^{-1}$.

*Analysis.*—Calcd. for $C_{15}H_{13}N_7$: C, 61.8; H, 4.5; N, 33.7. Found: C, 62.1; H, 4.3; N, 33.6.

EXAMPLE XXVI 1,1,2,6,7,7-hexacyano-2,4,6-heptatriene is prepared by passing an aqueous solution of tetramethylammonium 1,1,2,6,7,7-hexacyano-2,4,6-heptatrienide over a column of an acidic ion exchange resin (Amberlite 120). A portion of the solution containing 15 parts of 1,1,2,6,7,7-hexacyano-2,4,6-heptatriene is diluted to a total of 500,000 parts with water and 15,000 parts of photographic gelatin is added. The gelatin is dissolved by heating and stirring at about 80° C. for a few minutes. The resulting solution is cooled and coated on a cellulose acetate photographic film base to yield, when dry, a blue antihalation coating 0.35 mil thick having an optical density of 0.41. A strip of this film is treated with a conventional aqueous photographic developer (Kodolith) at pH 9.48 for 5 minutes. The blue color of the 1,1,2,6,7,7-hexacyano-2,4,6-heptatriene is completely discharged. The film is then rinsed in water and treated for 5 minutes in a conventional aqueous photographic acid fixing bath (Du Pont 18–F) at pH 4.3. There is no return of the color.

EXAMPLE XXVII

The process of Example XXVI is repeated with the exception that (a) 61.5 parts of 1,1,2,6,7,7-hexacyano-2,4,6-heptatrienide is used in place of 15 parts and (b) the dried coating on the film base is 1 mil thick. This coating has an optical density above 2, i.e., so deep it cannot be measured accurately.

All the products of this invention are useful as dyes. This utility is illustrated as follows:

Dyeing Example A

Swatches of cellulose acetate, nylon, silk, anl wool fabrics are placed in a dye bath containing 15 parts of tetramethylammonium 1,1,2,4,5,5 - hexacyano-2,4-pentadienide and 20 parts of a sulfonated lignin dispersant in 200,000 parts of water. The mixture is boiled for one hour. The fabrics are removed, washed thoroughly with soap and water, rinsed, and dried. They are dyed the following colors: cellulose acetate, pink; nylon, bright magenta; silk, mauve; and wool, brownish rose.

Dyeing Example B

Swatches of cellulose acetate, nylon, silk, and wool fabrics are placed in a dye bath containing 20 parts of ammonium 1,1,2,6,7,7-hexacyano-2,4,6-heptatrienide and 14 parts of a sulfonated lignin dispersant in 200,000 parts of water. The mixture is boiled for one hour. The fabrics are removed, washed thoroughly with soap and water, rinsed and dried. They are dyed the following colors: cellulose acetate, light blue; nylon, deep blue; silk, blue; and wool, deep green.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula

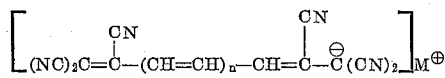

wherein $n$ is a cardinal number of from zero to one and M is one equivalent of a cation selected from the class consisting of hydrogen, ammonium, diethylammonium, tetramethylammonium, phenylammonium, trimethylsulfonium, and metallic cations.

2. Salts of 1,1,2,4,5,5-hexacyano-2,4-pentadiene wherein the cations of said salts are selected from the groups consisting of ammonium, diethylammonium, tetramethylammonium, phenylammonium, trimethylsulfonium, and metallic cations.

3. 1,1,2,4,5,5-hexacyano-2,4-pentadiene.

4. Salts of 1,1,2,6,7,7 - hexacyano - 2,4,6 - heptatriene wherein the cations of said salts are selected from the group consisting of ammonium, diethylammonium, tetramethylammonium, phenylammonium, trimethylsulfonium, and metallic cations.

5. 1,1,2,6,7,7-hexacyano-2,4,6-heptatriene.

6. Sodium 1,1,2,6,7,7-hexacyano-2,4,6-heptatrienide.

7. Silver 1,1,2,6,7,7-hexacyano-2,4,6-heptatrienide.

8. Ammonium 1,1,2,6,7,7-hexacyano - 2,4,6 - heptatrienide.

9. Tetramethylammonium 1,1,2,4,5,5 - hexacyano-2,4-pentadienide.

10. Process for the formation of a 1,1,2,6,7,7-hexacyano-2,4,6-heptatriene which comprises effecting contact between a 4-hydrocarbyloxy-1,2,2-tricyano-1,3-butadiene, wherein the hydrocarbyloxy group is aliphatically saturated and of from 1 to 20 carbons, and at least one member of the class consisting of water, lower alkanols and N,N-di(lower)alkylamides, and isolating the resulting product.

11. Process for the formation of a 1,1,2,4,5,5-hexacyano-2,4-pentadiene which comprises reacting a tricyanovinyl compound with a 4-hydrocarbyloxy-1,1,2-tricyano-1,3-butadiene, wherein the hydrocarbyloxy group is aliphatically saturated and of from 1 to 20 carbons, in the presence of a member of the class consisting of water, lower alkanols and N,N-di(lower)alkylamides, and isolating the resulting product.

No references cited.